Figure 1:
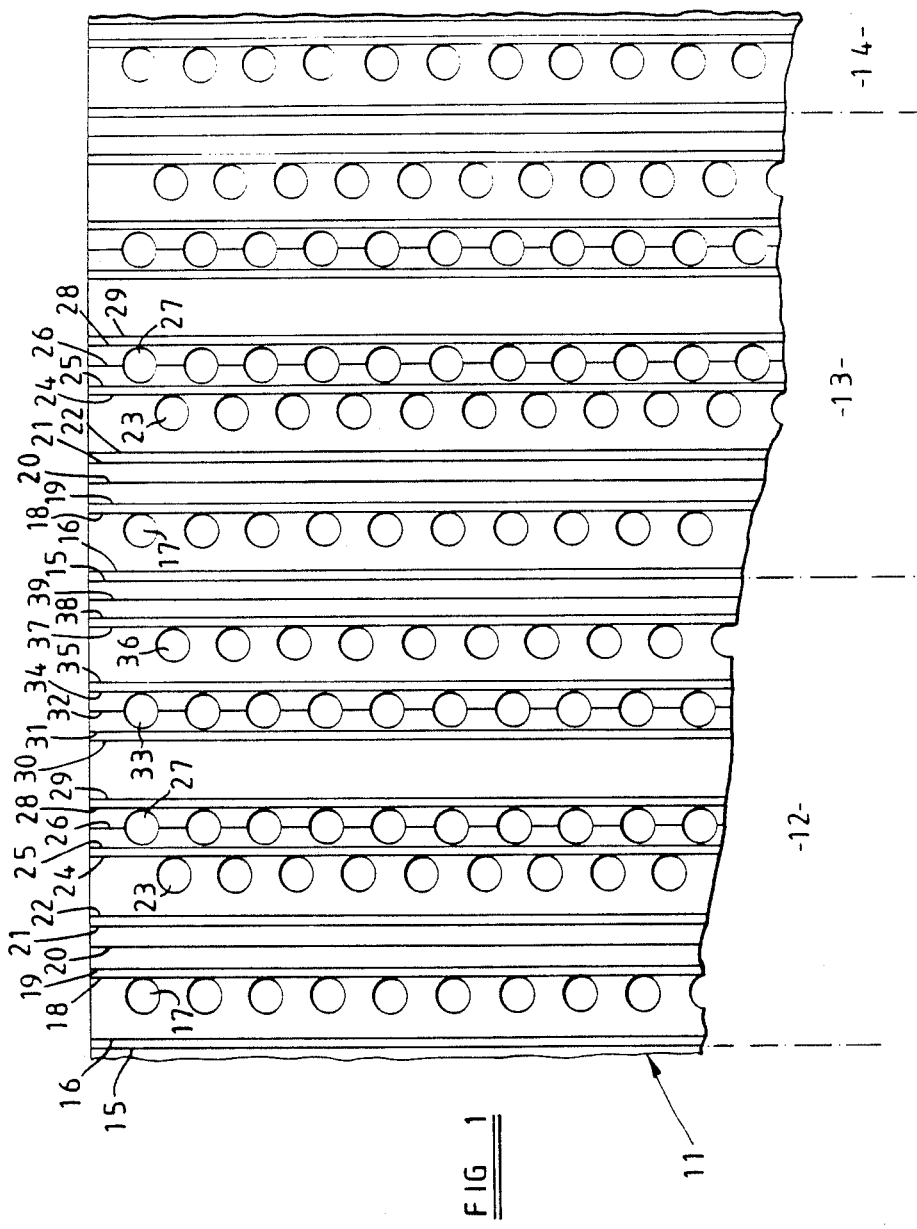

United States Patent [19]
Dixon et al.

[11] Patent Number: 4,799,944
[45] Date of Patent: Jan. 24, 1989

[54] GAS FILTER

[75] Inventors: George Dixon, Sidmouth, England; Henry W. Eaves, Gullane, Scotland

[73] Assignees: Binks Bullows Limited; Spencer & Co., Limited, both of England

[21] Appl. No.: 173,087

[22] Filed: Mar. 25, 1988

[30] Foreign Application Priority Data

Mar. 28, 1987 [GB] United Kingdom ............... 8707482

[51] Int. Cl.⁴ .............................................. B01D 45/00
[52] U.S. Cl. ......................................... 55/446; 55/500; 55/521; 55/529
[58] Field of Search ................................ 55/442–446, 55/463, 500, 521, 529

[56] References Cited

U.S. PATENT DOCUMENTS

| | | | |
|---|---|---|---|
| 1,807,378 | 5/1931 | Budil et al. | 55/444 |
| 2,227,385 | 12/1940 | Benedict | 55/521 X |
| 2,471,548 | 5/1949 | Schaaf | 55/521 X |
| 3,022,861 | 2/1962 | Harms | 55/500 |
| 3,075,337 | 1/1963 | Andreae | 55/446 |
| 3,394,713 | 7/1968 | Thomson et al. | 55/529 X |
| 3,594,989 | 7/1971 | Bastiaans | 55/529 X |
| 4,008,060 | 2/1977 | Andreae | 55/446 |
| 4,452,619 | 6/1984 | Wright | 55/500 X |
| 4,640,779 | 2/1987 | Taki et al. | 55/529 X |

Primary Examiner—Kathleen J. Prunner
Attorney, Agent, or Firm—Andrus, Sceales, Starke & Sawall

[57] ABSTRACT

A gas filter which is formed from a single continuous sheet of material folded along a plurality of parallel fold lines and interconnected at appropriate folds so as to produce an element having spaced front and rear faces and a plurality of partition walls extending between said front and rear faces and defining therebetween a plurality of chambers of wedge-shaped cross-section, the wedge-shapes of adjacent chambers being oppositely orientated, and, said sheet being formed with apertures such that gas can flow through the filter from the front face to the rear face and in so doing is constrained to pass through apertures in at least one partition wall so as to pass through at least two adjacent chambers.

6 Claims, 11 Drawing Sheets

GAS FILTER

This invention relates to a gas filter, primarily but not exclusively for use in a spray painting booth.

British Pat. No. 1507422 illustrates a known form of gas filter comprising three interconnected sheets of stiff paper or the like which are folded in the manner of the bellows of an accordian and which are interconnected at the apices of their folds to define chambers. The sheets are perforated so that gas can flow through the chambers of the filter from front to rear of the filter and in so doing will follow a nonlinear path whereby particles contaminating the gas impinge upon and are retained by the surface of the sheets. Such filters are advantageous in that they can can be folded substantially flat for transportation and storage, and when so folded occupy a volume which is only fractionally larger than the volume of the material used to form the filter. However such filters are disadvantageous in that their manufacture involves the handling and shaping of three separate sheets, and the subsequent interconnection of the sheets at appropriate apices of the folded sheets. It is an object of the present invention to provide a gas filter, in a simple and convenient form, maintaining the advantages of the aforementioned known filter, while minimisig the disadvantages thereof.

In accordance with the present invention there is provided a gas filter which is formed from a single continuous sheet of material folded along a plurality of parallel fold lines and interconnected at appropriate folds so as to produce an element having spaced front and rear faces and a plurality of partition walls extending between said front and rear faces and defining therebetween a plurality of chambers of wedge-shaped cross-section, the wedge-shapes of adjacent chambers being oppositely orientated, and, said sheet being formed with apertures such that gas can flow through the filter from the front face to the rear face and in so doing is constrained to pass through apertures in at least one partition wall so as to pass through at least two adjacent chambers.

Conveniently the positioning of the apertures is such that in flowing from the front face to the rear face the gas must pass through apertures in three partition walls, and thus must flow through four consecutive chambers.

Alternatively the positioning of the apertures and folds is such that in flowing from the front face to the rear face the gas may flow along two converging routes one of which includes passage through apertures in one parition wall and the other of which includes passage through apertures in three partition walls one of which is the partition wall of the first route.

Conveniently the formation of at least some of the apertures produces integral flaps of sheet material which are bent to engage, and are secured to, selected walls of the filter chambers.

Desirably interconnections are made by means of an adhesive.

In the accompanying drawings

Figure 2:
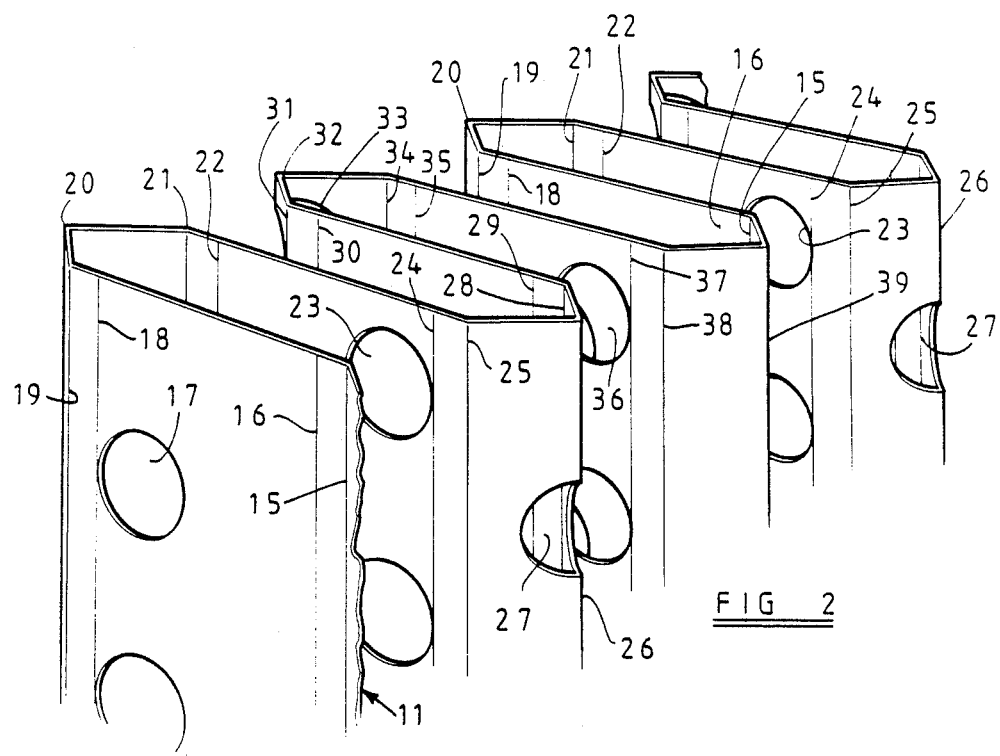
Figure 3:
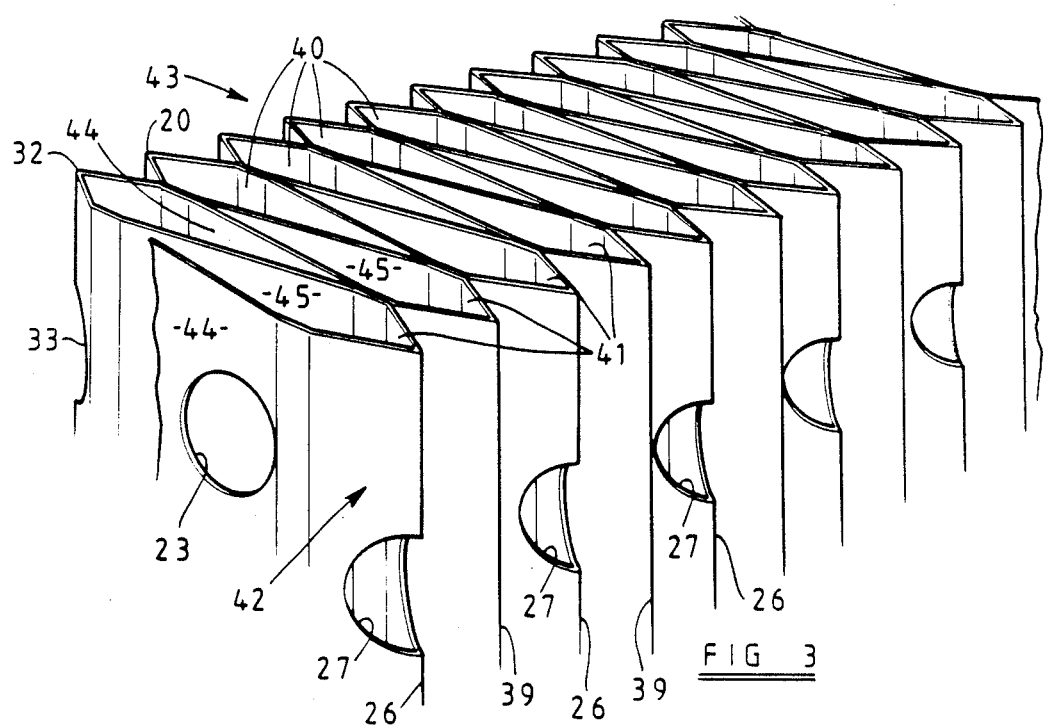
Figure 4:
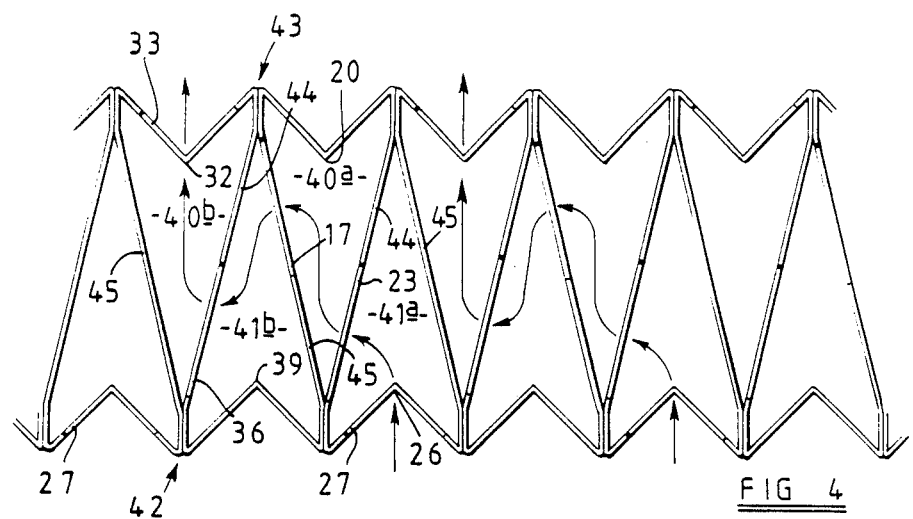
Figure 5:
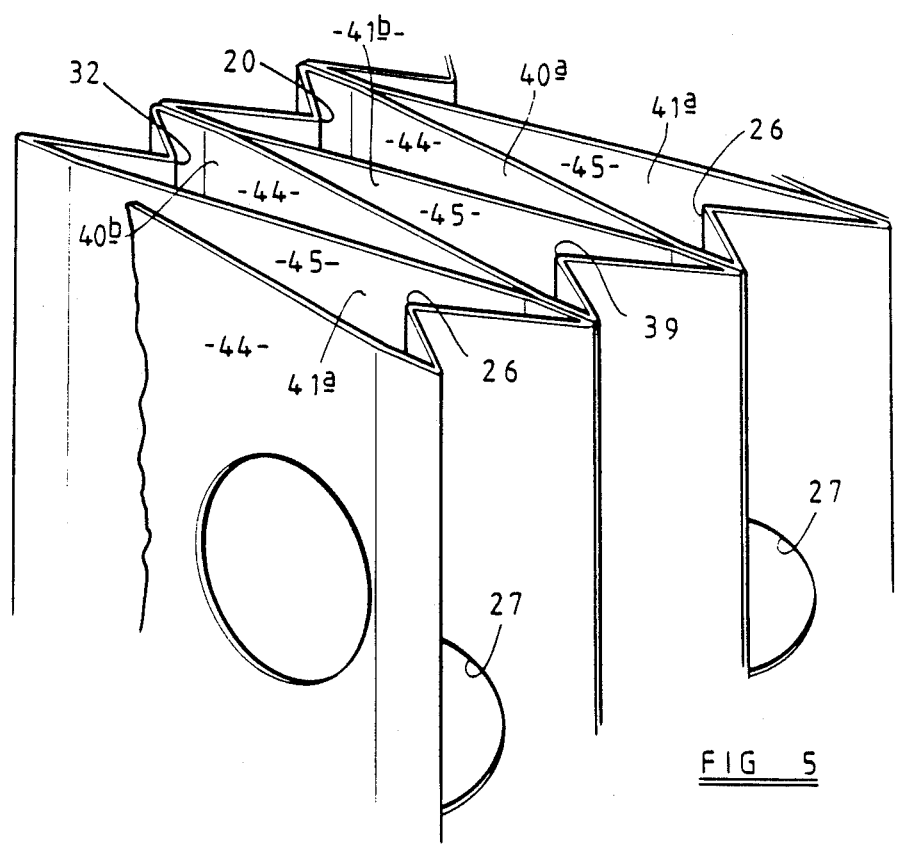
Figure 6:
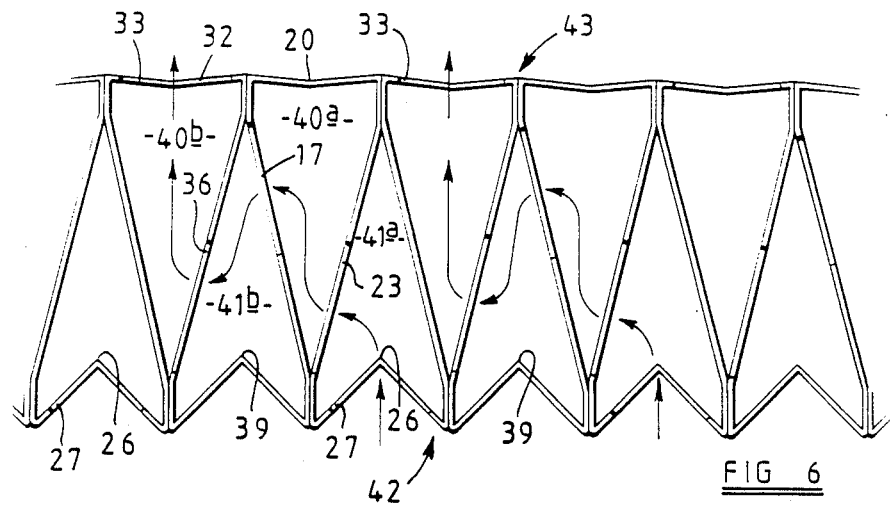
Figure 7:
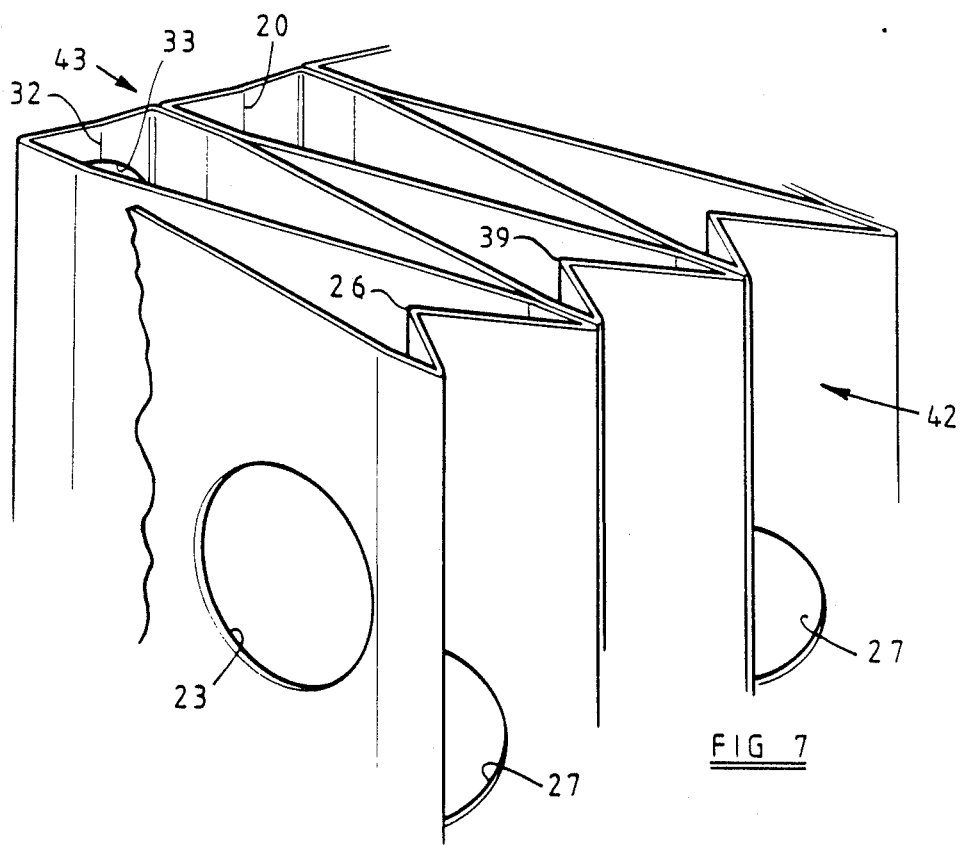
Figure 8:
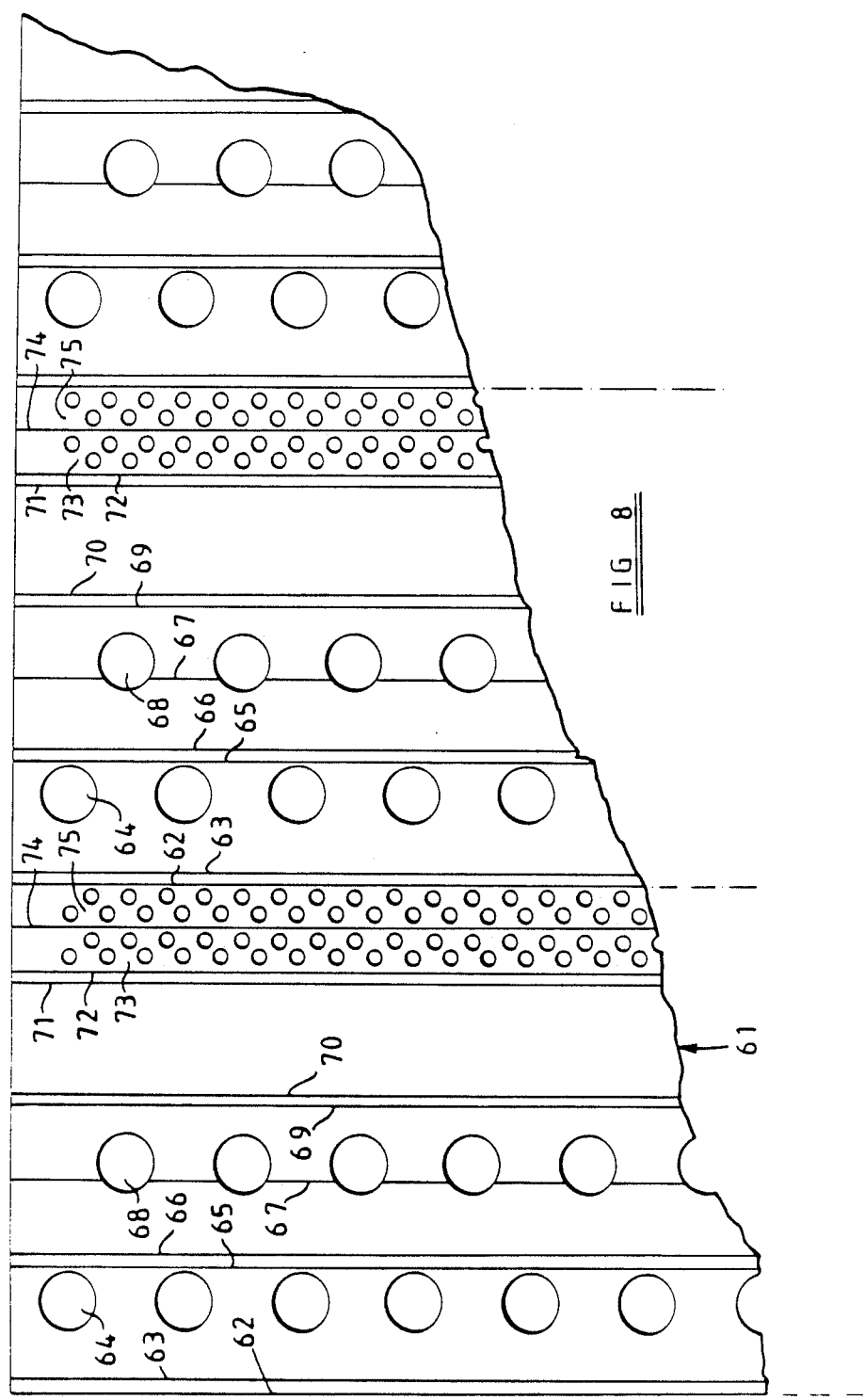
Figure 9:
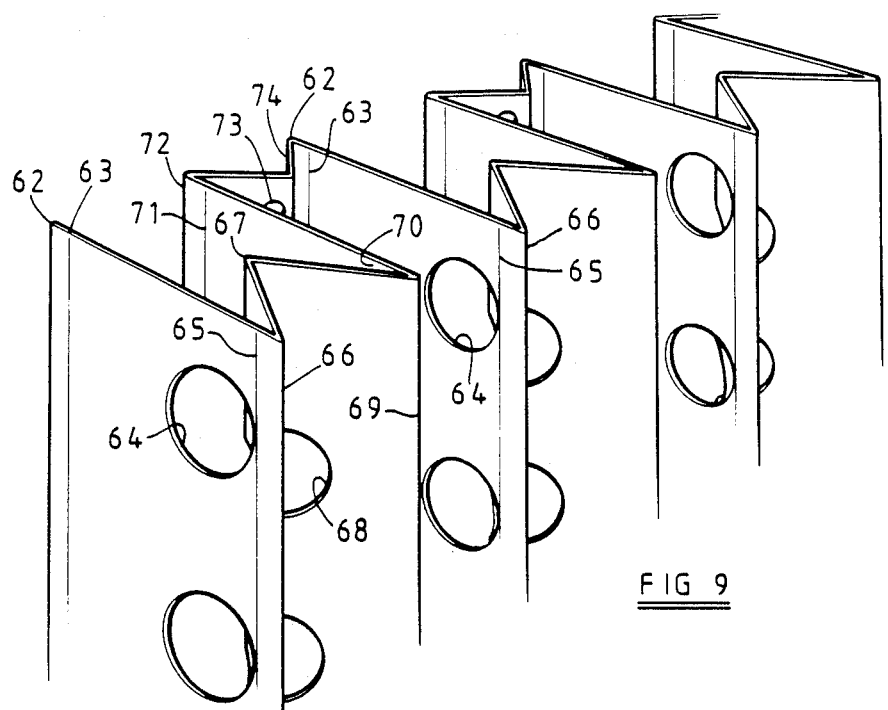
Figure 10:
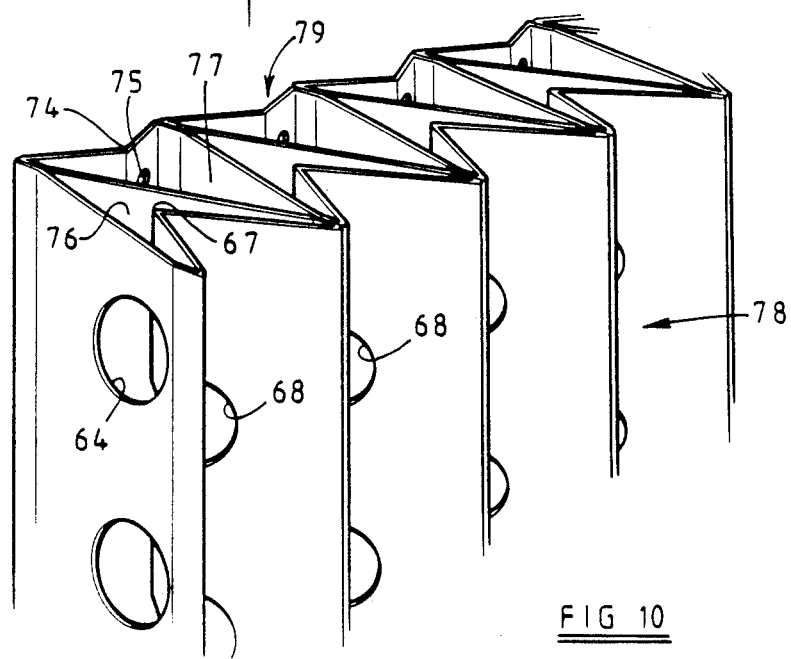
Figure 11:
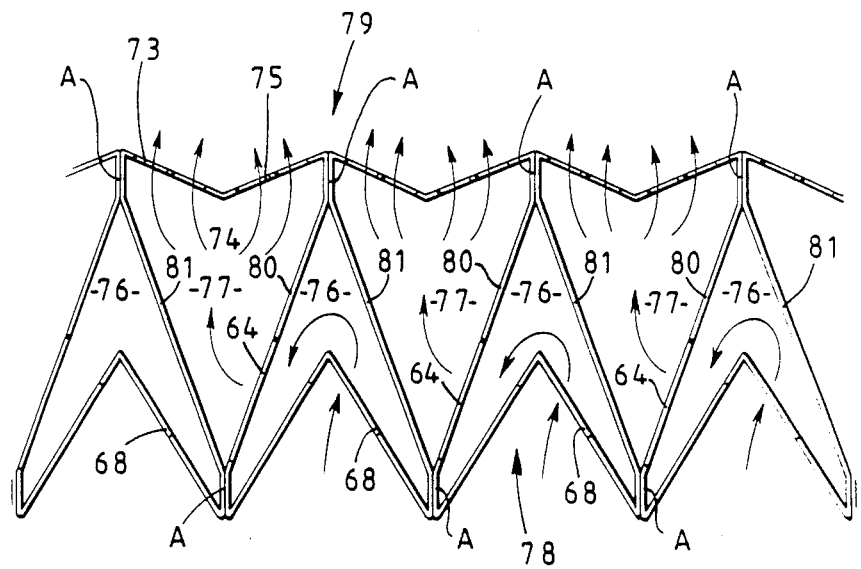
Figure 12:
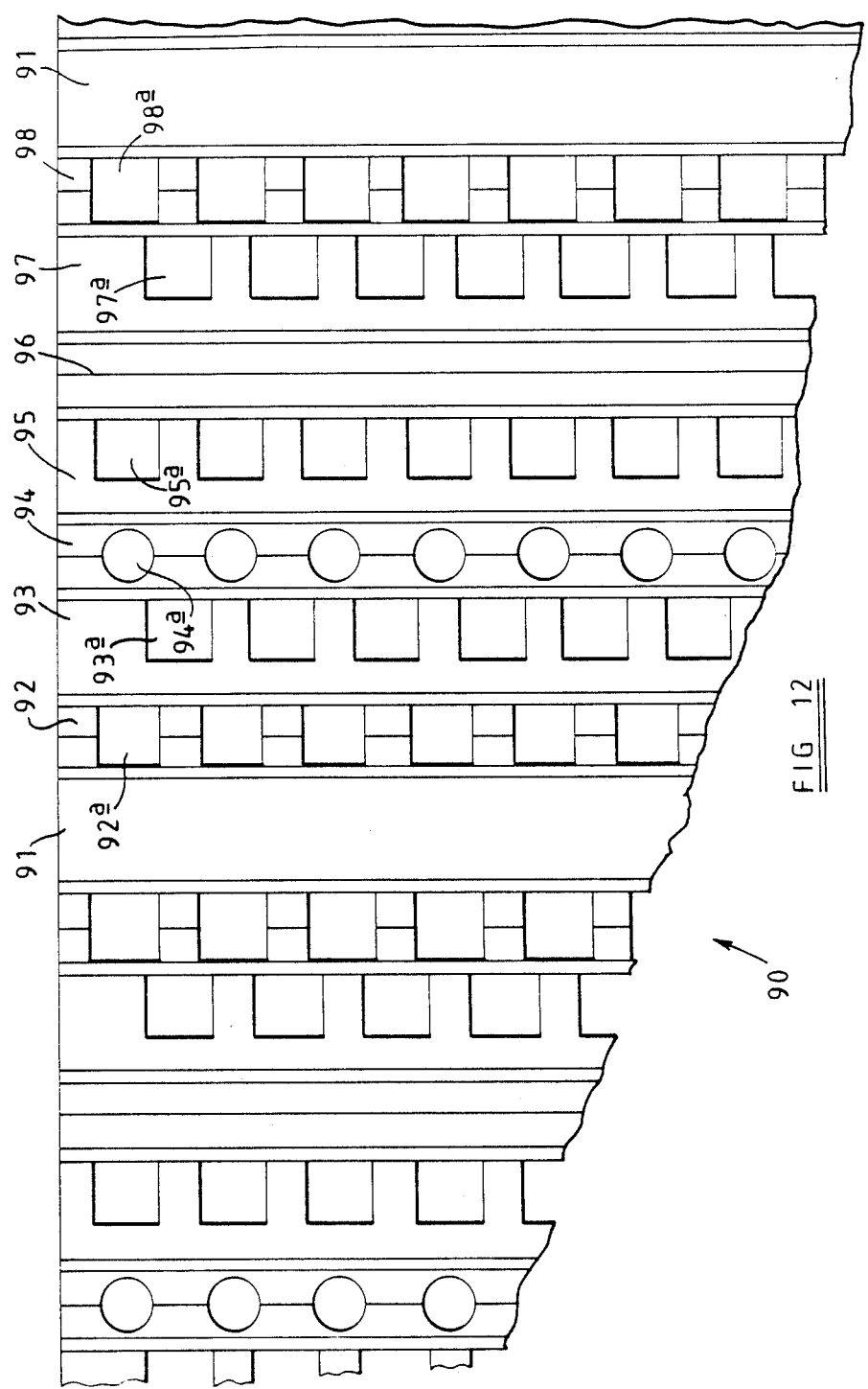
Figure 13:
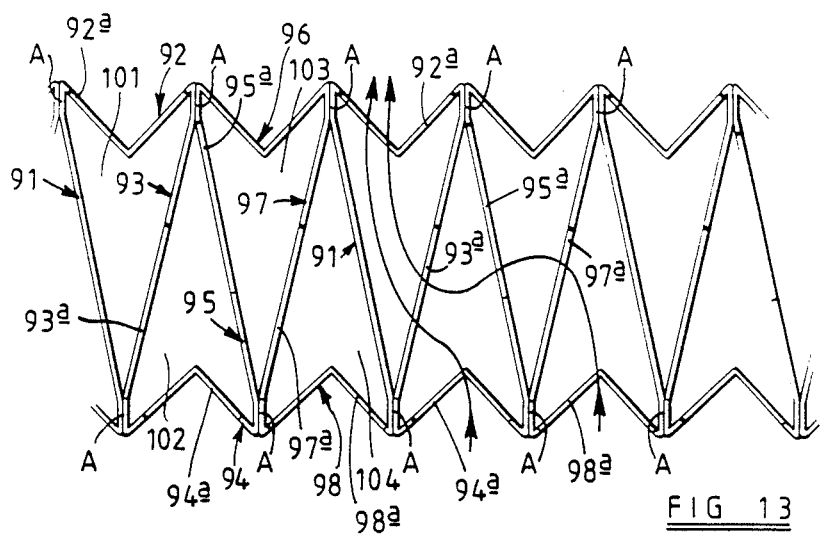
Figure 14:
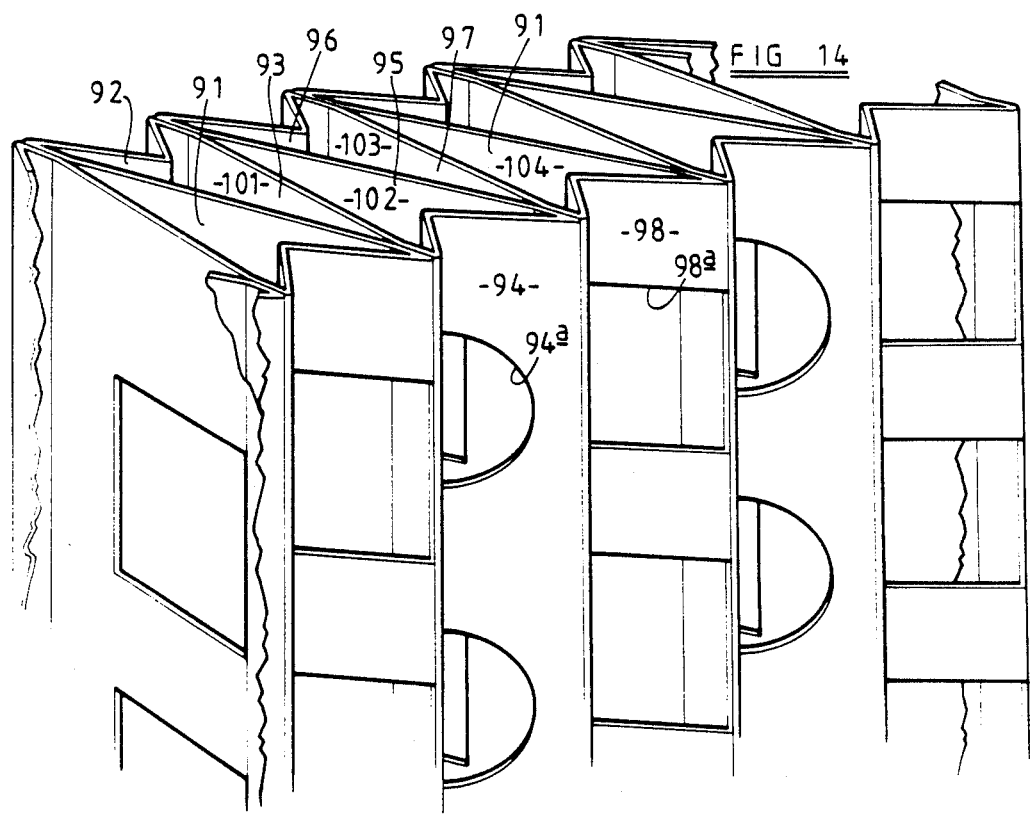
Figure 15:
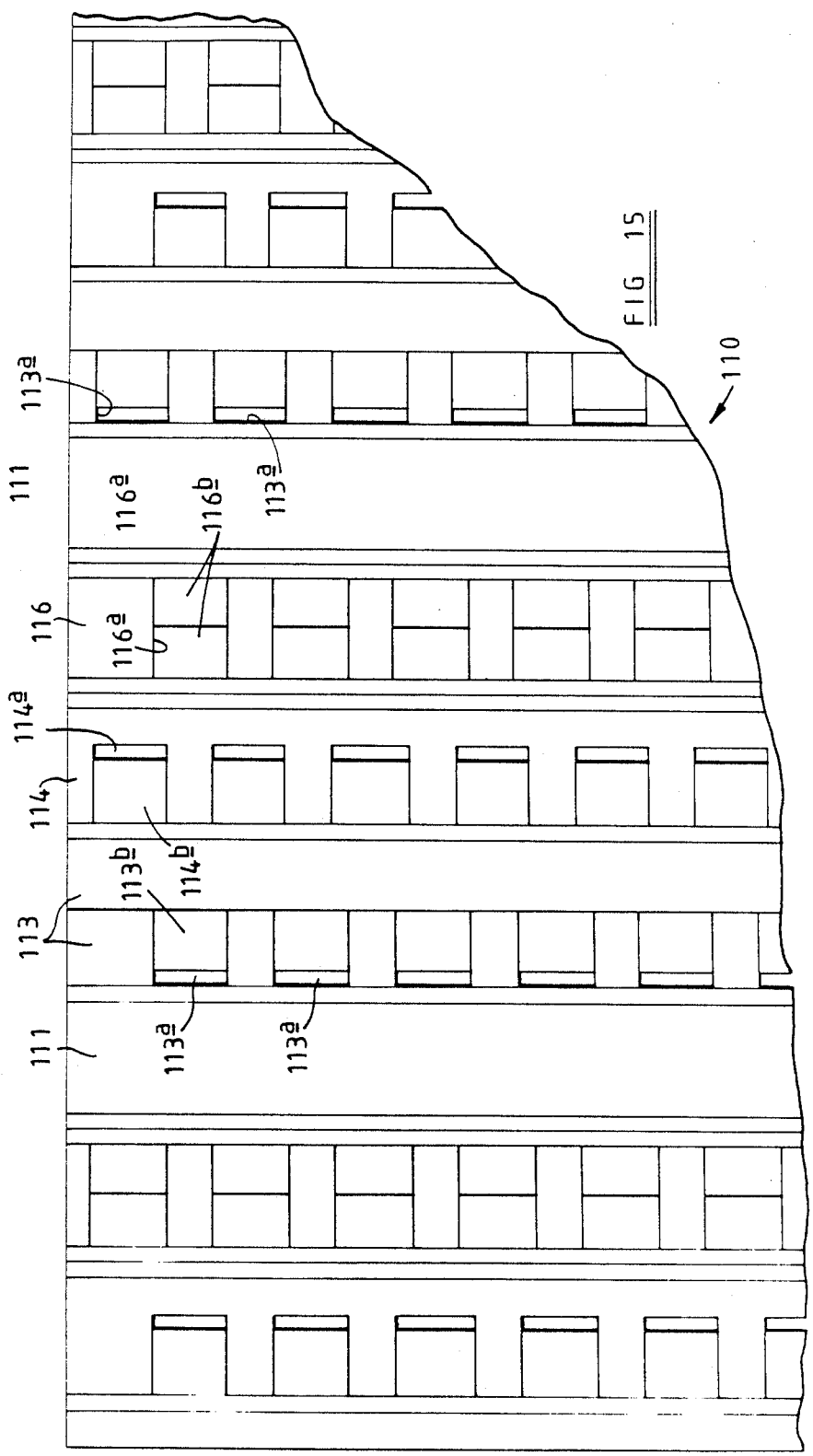
Figure 16:
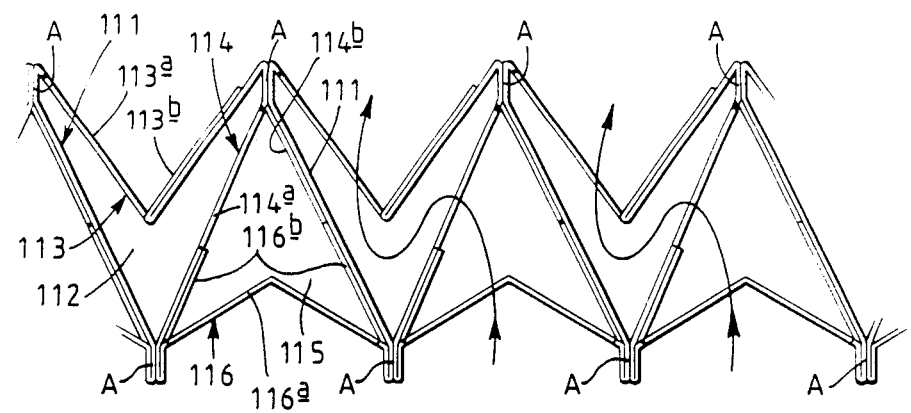
Figure 17:
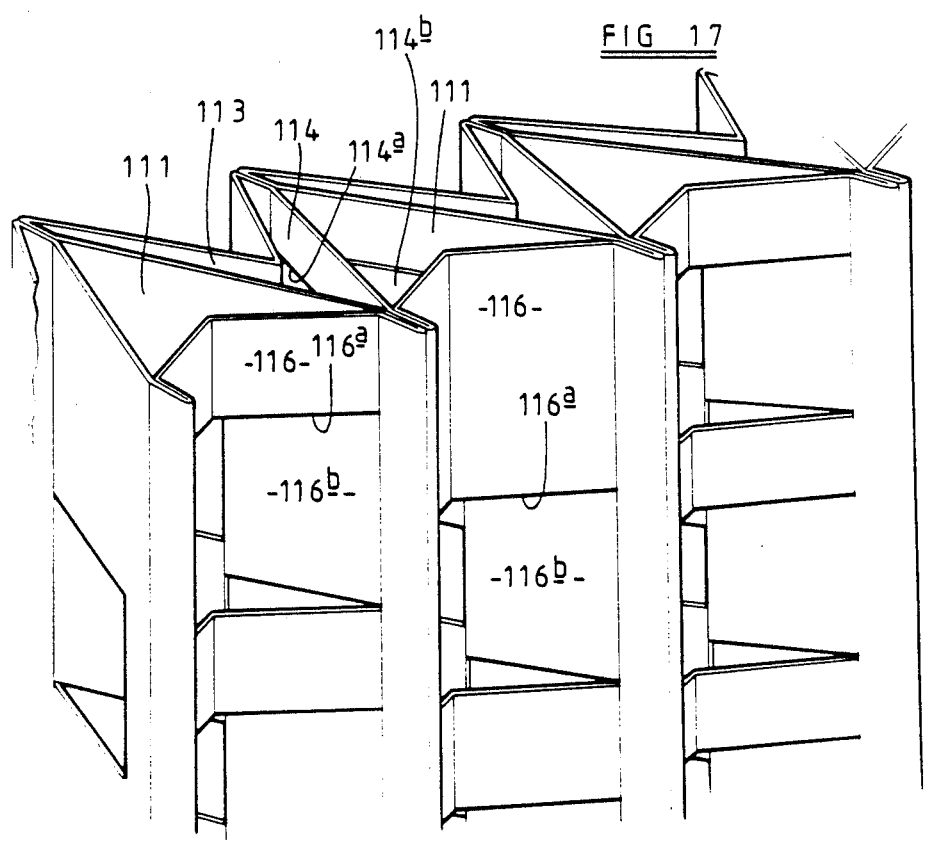

FIG. 1 is a plan view of part of a blank from which can be formed a gas filter in accordance with a first embodiment of the present invention, FIG. 2 is a perspective view of the blank of FIG. 1 part-way through its formation into a gas filter, FIG. 3 is a perspective view of a gas filter manufactured from the blank of FIG. 1, and in a partly expanded condition, FIG. 4 is a sectional view of the filter shown in FIG. 3, in the configuration which it assumes in use, FIG. 5 is a perspective representation of the filter in use, FIGS. 6 and 7 are views similar to FIGS. 4 and 5 respectively of a modification of the filter, FIG. 8 is a view similar to FIG. 1 of a blank for use in the formation of a gas filter in accordance with a second embodiment of the present invention, FIG. 9 is a view illustrating one stage in the formation of a gas filter using the blank of FIG. 8, FIG. 10 is a perspective view of the gas filter formed from the blank of FIG. 8, and FIG. 11 is a sectional view illustrating the filter of FIG. 10 in use, FIG. 12 is a view similar to FIG. 1 of a blank for use in the formation of a gas filter in accordance with a third embodiment of the present invention, FIG. 13 is a sectional view of the filter constructed from the blank of FIG. 12 in its "in use" configuration, FIG. 14 is a perspective representation of the filter of FIG. 13, FIG. 15 is a view similar to FIG. 8 of a modification thereof, FIG. 16 is a sectional view of the filter constructed from the blank of FIG. 15 in its "in use" configuration, and, FIG. 17 is a perspective representation of the filter of FIG. 16.

Referring first to FIGS. 1 to 5 of the accompanying drawings, the gas filter is formed from a single sheet of stiff paper, conveniently "Superwhite Uniliner" of 350 micron thickness, available from Purfleet Board Mills, the width of the sheet being equal to the desired height of the filter and the length of the sheet being determined by the desired width of the filter. The length of the sheet will be quite substantial, and in practice it may be preferable to produce continuous lengths of filter from a very long strip of material, the continuous filter then being cut to appropriate lengths for supply to users. In FIG. 1 the top to bottom direction represents the width direction of the sheet or strip of material, and the left to right direction represents the lengthwise direction of the sheet or strip. Throughout the remainder of this specification it will be assumed that the filters are to be formed from paper strip.

The plain paper strip passes through a machine, conveniently a combined punching, creasing, folding and gluing machine, which provides a repeating pattern of parallel fold lines and rows of apertures along the length of the strip. Details of the machine are not of importance to the invention, it being recognised that the operations could, if required, be manual. The fold lines and rows of apertures are parallel, and are transverse to the length of the strip. The chain dotted lines in FIG. 1 illustrate how the pattern repeats, and thus only one pattern section will be described.

In FIG. 1 the blank is indicated generally by the reference numeral 11, and the repeating pattern sections are indicated at 12, 13, and 14, it being understood that the pattern sections will be repeated along the whole length of the strip. Considering the pattern section 12, and commencing at the left hand end thereof, it can be seen that the pattern section includes first and second closely spaced fold lines 15, 16, and between the fold line 16 and a third fold line 18, and adjacent the fold line 18 is a first row of circular apertures 17. The apertures 17 are equally spaced across the width of the blank. A fourth fold line 19 is spaced from the fold the 18 by the same spacing as exists between fold lines 15 and 16 and spaced from the fold line 19 is a fifth fold line 20. Spaced from the fold line 20 by a distance equal to the spacing between fold lines 19 and 20 is a sixth fold line 21 and closely adjacent thereto is a seventh fold line 22. The spacing between fold lines 21 and 22 is equal to that between fold lines 15 and 16. Between the fold line 22 and an eighth fold line 24, and adjacent fold line 24 is a second row of circular apertures 23, the apertures 23 being of the same diameter, and at the same spacing, as apertures 17 but being staggered width-wise of the strip in relation to the apertures 17 so that an aperture 23 aligns with the mid-point between a pair of apertures 17. The fold line 24 is spaced from the fold line 22 by a distance equal to the spacing between the fold lines 16 and 18.

Spaced from fold line 24 by a distance equal to the spacing between fold lines 15 and 16 is a ninth fold line 25. A tenth fold line 26 is spaced from the fold line 25 by a distance equal to the spacing between the fold lines 19 and 20 and a third row of circular apertures 27 is disposed along the fold line 26, the apertures 27 being aligned with the apertures 17. Spaced from the fold line 26 by a distance equal to the spacing between fold lines 25 and 26 is an eleventh fold line 28 and closely adjacent thereto is a twelfth fold line 29. Spaced from the fold line 29 by a distance equal to the spacing between fold lines 16 and 18 is a thirteen,th fold line 30 and closely adjacent thereto is a fourteenth fold line 31. The fold lines 30 and 31 together with fifteenth, sixteeth and seventeenth fold lines 32, 34, 35 and a fourth row of apertures 33 constitute a repeat of the fold lines and apertures 24–29.

Between the fold line 35 and an eighteenth fold line 37, and adjacent fold line 37 is a fifth row of circular apertures 36 identical to the row of apertures 23. The fold line 37 is spaced from the fold line 35 by a distance equal to the spacing between the fold lines 16 and 18 and closely adjacent thereto is a ninteenth fold line 38. The pattern section is concluded by a twentieth fold line 39 which is spaced from the fold line 38 by a distance equal to the spacing between the fold lines 19 and 20. Thereafter the pattern section is repeated throughout the length of the strip.

The formation of the filter from the blank 11 is relatively simple, and is best understood with reference to FIGS. 2 and 3. Fold lines 20, 26, 32 and 39 may be considered to be the principal fold lines, and in general terms the blank is folded into a zig-zag arrangement about the fold lines 20, 26, 32 and 39. After such folding it will be recognised that the filter has a depth dimension and it will be seen that the apices 20 and 32 are at the opposite limit of the depth dimension to the apices 26 and 39. Naturally the basic zig-zag fold arrangement is repeated in the adjacent, and subsequent pattern sections of the blank. If the blank is simply folded about the fold lines 20, 26, 32 and 39, and is compressed to minimum length, it will be recognised that the area of the front surface of the blank which lies between the fold lines 15 and 16 lies in facial contact with the area of the front surface which lies between the fold lines 24 and 25. Adhesive is applied to the area between the fold lines 15 and 16 so that the area between the fold lines 15 and 16 is adhesively secured to the area between the fold lines 24 and 25. Similary, the area of the rear face of the blank between the fold lines 21 and 22 is adhesively secured to the area of the rear face of the blank between the fold lines 30 and 31 and the area of the front face of the blank between the fold lines 28 and 29 is similarly adhesively secured to the area of the front face of the blank between the fold lines 37 and 38. The area of the rear face of the blank between the fold lines 34 and 35 is adhesively secured to the area of the rear face of the blank between the fold lines 18 and 19 of the next pattern section. This procedure is repeated throughout the length of the blank and it will be recognised that thereafter when a loading is applied in the direction of the depth of the filter to press the apices 26, 39, towards the apices 20, 32, the folded blank will expand lengthways, and will reduce in depth as the material bends about all of the fold lines to produce a series of alternately, oppositely directed, wedge-shaped chambers 40, 41 bounded by front and rear walls 42, 43, and separated by inclined partition walls 44, 45.

In practice the filter will be expanded lengthways by a predetermined amount and will be received within a channel-section frame which closes the upper and lower edges of the filter, that is to say forms a top and bottom closure for the chambers 40, 41, of the filter. As seen in FIGS. 4 and 5, when the filter is in the configuration which it occupies in use, the apices 20, 26, 32, 39, have been moved over-centre so as to project into their repective chambers 40, 41. During use the front face 42 of the filter will be presented towards a source of contaminated air, for example the interior of a spray booth, and the rear face 43 of the filter will be subjected to air pressure which is lower than the air pressure acting on the front face 42. Conveniently, the face 43 is exposed to a chamber from which air is withdrawn by a fan. Thus there is generated an air flow from the front face 42 to the rear face 43 of the filter and contaminated ambient atmosphere to which the front face 42 is presented is drawn into the filter.

The air flow through the filter is as follows. The contaminated air can only enter the filter through apertures 27 since these are the only apertures which open in the front face of the filter. It will be seen that apertures 27 open into alternate chambers 41 (the inlet chambers 41 being identified at 41a in FIGS. 4 and 5). The only route which air can take from a chamber 41a is through the apertures 23 in the partition wall 44 separating a chamber 41a from the adjacent chamber 40a. There is no exit in the rear wall of a chamber 40a, but the partition wall 45 separating a chamber 40a from a chamber 41b contains apertures 17. Thus, the air flows from chamber 40a into chamber 41b from where the only route is via apertures 36 in the partition wall 44 separating a chamber 41b from the adjacent chamber 40b. Chambers 40b have apertures 33 in their rear wall 43, and it will also be noted that the partition walls 45 separating chambers 40b from adjacent chambers 41a are solid walls, in that they do not contain any apertures. Thus air which entered the filter through apertures 27 exits through apertures 33 having passed through intervening chambers 41a, 40a, 41b, and 40b.

It will be recognised that within the spray booth there will be generated a flow of air contaminated with paint particles towards the front face 42 of the filter. Thus when being drawn into the apertures 27 contaminated air will impinge on the front face of the filter and thus some of the paint particles contaminating the air will adhere to the front face 42. The air which passes through the apertures 27 is caused to make repeated changes of flow direction in order to pass through the apertures 23, 17, 36, and 33, and at each change in direction paint particles can stick to, and thus be trapped by, the surface of the walls defining the chambers 40 and 41. Thus a very substantial proportion of the paint particles contaminating the air entering the filter will be retained by the filter so that the air leaving the filter by way of the apertures 33 will be of sufficient purity to be exhausted directly into the atmosphere.

The filter illustrated in FIGS. 6 and 7 is very similar to the filter illustrated in FIGS. 1 to 5, differing only in that the spacing between the fold lines of the regions of the blank which define the rear face 43 of the filter is smaller than the spacing between the equivalent fold lines of the region of the blank which define the front face 42 of the filter. Thus when the filter is in use it can be expanded lengthwise until the rear face 43 is substantially flat, it being recognised that this configuration provides a natural limit to the amount by which the filter can be extended from its "folded-flat" configuration. Thus when fitting the filter of FIGS. 6 and 7 into the filter support frame the filter is stretched until the rear face 43 is substantially flat and the filter is then clamped in position in the frame. The flow path through the filter of FIGS. 6 and 7, and the mode of construction of the filter is exactly as described above. Thus the filter of FIGS. 6 and 7 carries the same reference numerals as those used in FIGS. 1 to 5.

It will be recognised that both the filter of FIGS. 1 to 5 and the filter of FIGS. 6 and 7 can be folded completely flat for transportation purposes, whereupon the volume occupied by the filter is substantially only the volume of material used to form the filter. FIG. 3 shows the filter extended by a small amount from its "folded-flat" configuration and it is easily recognised with reference to FIG. 3 that by pressing the ends of the filter towards one another the chambers 40, 41, will press substantially flat so that the filter occupies the minimum volume for transportion and storage purposes.

Referring now to FIGS. 8 to 11, there is illustrated a filter in accordance with a second embodiment of the present invention. The mode of construction of the filter illustrated in FIGS. 8 to 11 is substantially identical to that described above with reference to FIGS. 1 to 5, although the repeating patterns of fold lines and apertures on the blank differ. In particular, it is a primary intention of the filter of FIGS. 8 to 11 that air entering the front face of the filter shall only pass through two chambers in reaching exit apertures at the rear face of the filter. Thus, the number of direction changes which the air must undergo in passing through the filter is reduced by comparison with the filter of FIGS. 1 to 5. The filter of FIGS. 8 to 11 may, for example, be preferred in a system where the pressure drop across the filter is to be minimised, although it will be recognised that aperture size and frequency are also of importance when considering pressure drop.

As can be seen in FIG. 8, each pattern section of the blank 61 comprises first and second parallel and closely adjacent fold lines 62, 63 and parallel to fold lines 63, but spaced therefrom is a fold line 65, there being a row of apertures 64 between the fold lines 63 and 65, and adjacent the fold line 65. Closely adjacent the fold line 65 is a fold line 66 the fold lines 65 and 66 being spaced apart by a distance equal to the spacing between the fold lines 62 and 63. Spaced from the fold line 66 is a further fold line 67, and spaced from the fold line 67 by a distance equal to the spacing between fold lines 66 and 67 is a further fold line 69. A row of apertures 68 is provided between the fold lines 66 and 69, the apertures 68 having their centers arranged between the fold lines 67 and 69, and the diameter of the apertures 68 being equal to that of the apertures 64 and sufficient to intersect the fold line 67. Moreover, the apertures 68 are staggered width-wise of the blank with respect to the apertures 64 so that an aperture 68 is aligned with the mid-point between adjacent apertures 64.

Closely adjacent the fold line 69, and spaced therefrom by a distance equal to the spacing between the fold lines 62 and 63 is a further fold line 70. A similar pair of fold lines 71, 72, are spaced from the fold lines 69, 70, so that the gap between the fold lines 70 and 71 is equal to the gap between the fold lines 63 and 65. A double row 73 of small diameter circular apertures is positioned between fold lines 72 and a further fold line 74, and an identical double row 75 of small diameter circular apertures 75 is positioned between the fold line 74 and the fold line 62 of the next adjacent pattern section. The apertures of one row of each double row 73, 75 are staggered in relation to the other row of each double row.

As with the construction described above with reference to FIGS. 1 to 5, the areas between the closely adjacent pairs of fold lines 62, 63; 65, 66; 69, 70; 71, 72, are provided with adhesive for securing the blank to itself at appropriate points after folding into a zig-zag. The location of the adhesive is indicated in FIG. 11 by a letter A and it can be seen from FIGS. 9, 10, and 11 that although the basic construction is similar to that of the filter of FIGS. 1 to 5 in that there are alternate, oppositely directed wedge-shaped chambers 76, 77, defined between front, and rear faces 78, 79, by inclined partition walls 80, 81, the different arrangement of apertures in the blank affords a construction wherein each chamber 76 has inlet apertures 68 in its front face, and each chamber 77 has outlet apertures in rows 73, 75, in its rear face. Furthermore, each partition wall 80 contains apertures 64 whereas each partition wall 81 is solid. Thus the air flow from the front face 78 to the rear face 79 of the filter involves air entering chambers 76 through apertures 68, and then passing laterally to chambers 77 through apertures 64, the air exiting from chambers 77 at the rear face of the filter by way of the double rows 73, 75 of small apertures. Although it is not specifically illustrated in FIGS. 8 to 11 it is to be recognised that the filter can be arranged, for storage and transportation, with the apical folds 67, and 74 projecting outwardly so that the filter can be folded substantially flat.

It is intended that in use, the filter of FIGS. 8 to 11 will be arranged in a configuration similar to that shown in FIG. 6 in that the filter will be stretched lengthways until further stretching is prevented by the rear face 79 achieving a substantially flat configuration. As with the arrangement illustrated in FIG. 6, the front face 78 of the filter will still be convoluted since the width dimension of the limbs constituting the front face 78 of the filter are greater than those of the limbs constituting the rear face 79 of the filter.

It will be noted that FIG. 1 and FIG. 8 both illustrate sections of continuous blanks having repeating sequences of fold lines and rows of apertures. In both cases the sequences repeat without a gap between adjacent repeats, and thus the markers illustrated in FIGS. 1 and 8 indicating the start point of a sequence are totally arbitary, and could be placed in line with any of the features of the blank. For example, in FIG. 1 each pattern sequence could be considered to start and finish at a fold line 30 since the region between adjacent fold lines 30 contains, in the completed filter, the flow path from an aperture 26 in the front face of the filter to an aperture 33 in the rear face of the filter. Similarly, in FIG. 8 the start points of a pattern repeat could be considered to be the fold line 72 since in a completed filter as shown in FIG. 11 this part of the pattern would contain all of the elements of the flow path from an aperture 68 to the apertures in rows 73, 75.

The filter illustrated in FIGS. 12, 13 and 14 is basically of similar construction to those described above and utilises a similar material. Thus an elongate blank 90 has a repeating sequence of parallel fold lines and rows of apertures, which, after the blank has been folded and adhesively secured at regions A (FIG. 13) produces a filter having alternate, oppositely directed, wedge-shaped chambers. The apertures, and fold lines of the blank are arranged to result in a filter having a wedge-shaped chamber 101 having an uninterrupted side wall 91, a rearwall 92 containing a row of spaced square apertures 92a, and a side wall 93 containing spaced square apertures 93a, the apertures 93a being staggered in relation to the apertures 92a. The side wall 93 of course constitutes a side wall of the next adjacent wedge-shaped chamber 102, which has a front wall 94 containing a row of spaced circular apertures 94a. The other side wall 95 of the chamber 102 contains a row of spaced square apertures 95a, aligned with the apertures 92a. The wall 95 constitutes one side wall of the next adjacent chamber 103 which has an uninterrupted rear wall 96, and an opposite side wall 97 containing a row of spaced square apertures 97a aligned with the apertures 93a. The side wall 97 is a side wall of next adjacent wedge-shaped chamber 104 which has a front wall 98 pierced by square apertures 98a aligned with the apertures 95a, 94a and 92a. At this point the pattern starts to repeat since the other side wall of the chamber 104 is an uninterrupted wall 91. As is apparent from FIG. 13 there are two merging flow paths through each repeating section of the filter. There is a first flow path into the filter through apertures 94a, within a chamber 102, through the apertures 93a, the chamber 101, and out of the filter by way of the apertures 92a. However, merging with this flow path is a flow path in which air enters the filter through apertures 98a, passes through chamber 104, through apertures 97a, through chamber 103, and through apertures 95a into chamber 102. Within chamber 102 the air flow merges with the air flow entering through apertures 94a. Thus, some of the air entering the filter passes through four chambers before exiting through apertures 92a in the rear of the filter whereas the remainder of the air passing through the filter negotiates only two chambers before exiting by way of the apertures 92a.

Naturally, the relative sizes, frequencies, and positioning of the various apertures can be chosen in relation to one another to achieve a predetermined pressure drop across the filter. Moreover, the adjustment of the size, position and frequency of the apertures in relation to one another controls the proportions of the air flow which flow in the two alternative, and merging flow paths of the filter.

Turning now to FIGS. 15, 16 and 17, the filter illustrated again is of similar construction to those described above, and can be manufactured from similar materials. The filter is produced from a blank 110 having a repeating pattern of fold lines and rows of apertures. In this instance, all of the apertures are square or rectangular, and rather than the material of the blank being totally removed to form the apertures, each aperture is defined by cutting the blank to leave one or more attached flaps of material which, when folded out of the plane of the blank, leave the necessary apertures. As with the previously described examples the filter comprises a sequence of alternate oppositely directed wedge-shaped chambers. Fold regions at the front and rear faces of the filter are secured together by an adhesive (regions indicated at A in FIG. 16) and additionally the flaps produced by forming the apertures in the blank are adhesively secured to adjacent walls to strengthen the construction. It is convenient to consider the pattern repeat of the blank 110 starting with an uninterrupted region which constitutes an uninterrupted wall 111 of first chamber 112. The rear wall 113 of the chamber 112 is V-shaped, and in one portion thereof is a row of rectangular apertures 113a. Flaps 113b defined in the production of the apertures 113a are folded back and adhesively secured to the outer surface of the uninterrupted portion of the rear wall 113. The apertures 114a do not extend across the full width of the wall 114, and the flaps 114b defined in the production of the apertures 114a are folded outwardly from the wall 114 across the width of the next adjacent chamber 115. The wall 114 constitutes one side wall of the chamber 115, and the front wall 116 of the chamber 115 has spaced rectangular apertures 116a extending across its full width. Each aperture 116a provides a pair of oppositely directed flaps 116b one of which is folded against, and adhesively secured to, the uninterrupted portion of the wall 114 and the other of which is folded in the opposite direction, and is adhesively secured to, the other side wall 111 of the chamber 115. Thus, the second side wall 111 of the chamber 115 is equivalent to the side wall 111 of the chamber 112, and has adhesively secured thereto one of the flaps 116b and the flap 114b. At this point the pattern of folds and apertures in the blank can repeat. However, conveniently, as shown in FIGS. 15, 16 and 17 the repeat is not an identical repeat since there is a staggering (widthwise of the blank 110) of the repeating pattern. Thus, the apertures 113a in the first repeat are aligned with the uncut regions of the blank between the apertures 113a of the preceding pattern section. Apart from this staggering of the positioning of the apertures of the pattern repeats, the pattern repeats are identical. As is apparent from FIG. 16, an air flow impinging on the front face of the filter enters a chamber 115 by way of the apertures 116a. The air flow turns within the chamber 115 to pass through the apertures 114a and into the chamber 112 where it is turned again to exit from the rear face of the filter by way of the apertures 113a. Thus, paint laden air entering a chamber 115 impinges against both flaps 116b, a flap 114b, the uninterrupted portion of the wall 113, and the wall 111 in its passage through the filter.

It will be recognised that the use of square holes facilitates the provision of flaps which can be adhesively secured to other walls of the filter construction to provide strengthening. However, a similar effect can be obtained with part circular aperures if desired.

It will be recognised that the various rows of apertures are staggered in the direction of the height of the filter (the width of the blank) so as to ensure that the air flow through the filter is deflected both horizontally and vertically. In the arrangement illustrated in FIGS. 15, 16 and 17 the rectangular apertures 116a occupy more than half of the area of the front face, but the apertures 114a in the chamber side walls, and the apertures 113a in the rear wall of the filter occupy a much smaller area thereby providing a substantial surface area of filter material in the flow path through the filter onto which the air flow impinges.

It will be recognised that the staggering of apertures, in all of the filters describd above, in the direction of the height of the filter (width-wise of the blank) assists in ensuring that there are significant changes of air flow direction as the air passes through the filter, in that the air is caused to change direction both horizontally and vertically, thereby maximising the chances of paint particles impinging upon, and sticking to, the material of the filter.

It will be understood that the dimensions, and spacing of apertures can be varied to suit the application which the filter is to perform. For example it would be possible to provide the filter of FIGS. 1 to 5 with double rows of small diameter apertures such as the rows 73 and 75 of the filter of FIGS. 8 to 11 and similarly single rows of larger diameter apertures could be used in the rear face 79 of the filter of FIGS. 8 to 11 if desired. Moreover the material from which the filters described above are constructed need not be the "Superwhite Uniliner" paper mentioned above, for example it is believed that other types of stiff paper may be used and that other suitable materials include metal foil, plastics sheet material and woven or non-woven glass fibre materials. Although circular apertures are described above it is to be understood that other aperture shapes may prove suitable, for example, square or rectangular apertures (FIGS. 12–17) have the advantage that rather than the material which is cut out being scrapped each aperture may be formed by a three sided cut which leaves a rectangular flap (as in FIGS. 15–17) which, dependent upon the position of the aperture, may be used in the fixing together of the folds. We have described above the use of adhesive in securing the folds as necessary to produce the filter. However, it should be recognised that other fixing methods may be suitable, such as stapling, a combination of stapling and adhesive, and fusing or welding, the choice being governed at least in part by the material of the filter.

We claim:

1. A gas filter comprising a single continuous sheet of material folded along a plurality of parallel fold lines and interconnected at appropriate folds so as to produce an element having spaced front and rear faces and a plurality of partition walls extending between said front and rear faces and defining therebetween a plurality of chambers of wedge-shaped cross-section, the wedge-shapes of adjacent chambers being oppositely orientated, and said sheet being formed with apertures such that gas flows through the filter from an aperture in the front face to an aperture in the rear face and in so doing is constrained to pass through apertures in at least one partition wall so as to pass through at least two adjacent chambers.

2. A filter as claimed in claim 1 wherein the fold lines and apertures are positioned such that in flowing from the front face to the rear face the gas must pass through apertures in three partition walls, and thus must flow through four consecutive chambers.

3. A filter as claimed in claim 1 wherein the apertures and folds are positioned such that in flowing from the front face to the rear face the gas flows along two converging routes of which the first route includes passage through apertures in one partition wall and the second route of which includes passage through apertures in three partition walls one of which is the partition wall of the first route.

4. A filter as claimed in any one of the preceding claims wherein at least some of the apertures are formed to produce integral flaps of sheet material which are bent to engage, and are secured to, selected walls of the chambers.

5. A filter as claimed in claim 4 wherein interconnections are made by means of an adhesive.

6. A filter as claimed in any one of claims 1 to 3 wherein interconnections are made by means of an adhesive.

* * * * *